United States Patent
Cao

(10) Patent No.: US 11,966,707 B2
(45) Date of Patent: Apr. 23, 2024

(54) QUANTUM ENHANCED WORD EMBEDDING FOR NATURAL LANGUAGE PROCESSING

(71) Applicant: Zapata Computing, Inc., Boston, MA (US)

(72) Inventor: Yudong Cao, Cambridge, MA (US)

(73) Assignee: Zapata Computing, Inc., Boston, MA (US)

( * ) Notice: Subject to any disclaimer, the term of this patent is extended or adjusted under 35 U.S.C. 154(b) by 301 days.

(21) Appl. No.: 17/574,684

(22) Filed: Jan. 13, 2022

(65) Prior Publication Data

US 2023/0147890 A1 May 11, 2023

Related U.S. Application Data

(60) Provisional application No. 63/136,854, filed on Jan. 13, 2021.

(51) Int. Cl.
*G06F 40/40* (2020.01)
*G06F 15/16* (2006.01)
(Continued)

(52) U.S. Cl.
CPC .............. *G06F 40/40* (2020.01); *G06F 15/16* (2013.01); *G06F 40/30* (2020.01); *G06N 10/00* (2019.01); *G06V 30/19147* (2022.01)

(58) Field of Classification Search
CPC ................................ G06F 40/40; G06F 40/30
See application file for complete search history.

(56) References Cited

U.S. PATENT DOCUMENTS 9,663,358 B1    5/2017  Cory et al.
11,468,289 B2  10/2022  Cao et al.
(Continued)

FOREIGN PATENT DOCUMENTS

EP    3504667 A1    7/2019
EP    4104114 A1   12/2022
(Continued)

OTHER PUBLICATIONS

"Quantum Computing: Progress and Prospects" National Academies of Sciences, Engineering, and Medicine, pp. 1-273 (2019).
(Continued)

*Primary Examiner* — Bryan S Blankenagel
(74) *Attorney, Agent, or Firm* — Blueshift IP; Robert Plotkin

(57) ABSTRACT

A quantum-enhanced system and method for natural language processing (NLP) for generating a word embedding on a hybrid quantum-classical computer. A training set is provided on the classical computer, wherein the training set provides at least one pair of words, and at least one binary value indicating the correlation between the pair of words. The quantum computer generates quantum state representations for each word in the pair of words. The quantum component evaluates the quantum correlation between the quantum state representations of the word pair using an engineering likelihood function and a Bayesian inference. Training the word embedding on the quantum computer is provided using an error function containing the binary value and the quantum correlation.

38 Claims, 8 Drawing Sheets

(51) Int. Cl.
*G06F 40/30* (2020.01)
*G06N 10/00* (2022.01)
*G06V 30/19* (2022.01)

(56) References Cited

U.S. PATENT DOCUMENTS

| | | | |
|---|---|---|---|
| 11,605,015 | B2 | 3/2023 | Anschuetz |
| 11,636,370 | B2 | 4/2023 | Romero |
| 2007/0239366 | A1 | 10/2007 | Hilton et al. |
| 2007/0288684 | A1 | 12/2007 | Bergou et al. |
| 2015/0032994 | A1 | 1/2015 | Chudak et al. |
| 2015/0317558 | A1 | 11/2015 | Adachi et al. |
| 2015/0363708 | A1 | 12/2015 | Amin et al. |
| 2017/0223094 | A1 | 8/2017 | Johnson et al. |
| 2017/0364362 | A1 | 12/2017 | Lidar et al. |
| 2017/0364796 | A1 | 12/2017 | Wiebe et al. |
| 2018/0165601 | A1 | 6/2018 | Wiebe et al. |
| 2018/0247200 | A1 | 8/2018 | Rolfe |
| 2019/0197358 | A1 | 6/2019 | Madani et al. |
| 2019/0213495 | A1 | 7/2019 | Babbush et al. |
| 2019/0354897 | A1 | 11/2019 | Horesh et al. |
| 2019/0384597 | A1 | 12/2019 | Horesh et al. |
| 2019/0393399 | A1 | 12/2019 | Leipold et al. |
| 2020/0057957 | A1 | 2/2020 | Johnson et al. |
| 2020/0117702 | A1 | 4/2020 | Horesh et al. |
| 2020/0118025 | A1 | 4/2020 | Romero et al. |
| 2020/0134502 | A1 | 4/2020 | Anschuetz et al. |
| 2020/0394537 | A1 | 12/2020 | Wang et al. |
| 2021/0232963 | A1 | 7/2021 | Gimeno-Segovia et al. |
| 2021/0256351 | A1 | 8/2021 | Cao et al. |
| 2021/0287761 | A1 | 9/2021 | Camps et al. |
| 2022/0092035 | A1* | 3/2022 | Ganesh .................. G06N 3/045 |
| 2022/0198254 | A1* | 6/2022 | Dalli ...................... G06N 3/065 |
| 2022/0383177 | A1 | 12/2022 | Alcazar |
| 2023/0131510 | A1 | 4/2023 | Cao |

FOREIGN PATENT DOCUMENTS

| | | |
|---|---|---|
| EP | 4128085 A2 | 2/2023 |
| KR | 20160147988 A | 12/2016 |
| KR | 101822326 B1 | 1/2018 |
| WO | 2017001404 A1 | 1/2017 |
| WO | 2017066695 A1 | 4/2017 |
| WO | 2018064535 A1 | 4/2018 |
| WO | 2019032103 A1 | 2/2019 |
| WO | 2019077240 A1 | 4/2019 |
| WO | 2019177951 A1 | 9/2019 |
| WO | 2020037253 A1 | 2/2020 |
| WO | 2020077288 A1 | 4/2020 |
| WO | 2020086867 A1 | 4/2020 |
| WO | 2020077288 A9 | 3/2021 |
| WO | 2021102344 A1 | 5/2021 |
| WO | 2021163487 A1 | 8/2021 |
| WO | 2021247125 A2 | 12/2021 |
| WO | 2022155277 A1 | 7/2022 |
| WO | 2022173497 A2 | 8/2022 |
| WO | 2022173497 A9 | 9/2022 |

OTHER PUBLICATIONS

Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).
Cubitt, T., and Montanaro, A., "Complexity Classification of Local Hamiltonian Problems", 2014 IEEE 55th Annual Symposium on Foundations of Computer Science, p. 2 (2014) (Abstract).
Dyakonov, M., "The case against Quantum Computing", IEEE Spectrum, pp. 1-5 (Nov. 15, 2018).
Extended European Search Report dated May 19, 2022, in European patent application No. 19850377.3, 10 pages.
Gregory, A., and Chiang, C., "Simulation of Quantum Walks via Hamiltonian Reduction", 2018 IEEE Nanotechnology Symposium (ANTS), pp. 1 (2018) (Abstract).
Hempel, C. et al., "Quantum chemistry calculations on a trapped-ion quantum simulator," arxiv.org. Cornell University Library, 201 Olin Library Cornell University Ithaca, NY 14853, XP080859698, pp. 1-21 (Mar. 27, 2018).
Horgan, J., "Will Quantum Computing Ever Live Up to Its Hype?", Quantum Computing, Scientific American, pp. 6 (Apr. 20, 2021).
Moll, N., et al, "Quantum optimization using variational algorithms on near-term quantum devices," Quantum Science and Technology, vol. 3, pp. 18 (Jun. 19, 2018) [retrieved on Nov. 25, 2019]. Retrieved from <https://iopscience.iop.org/article/10.1088/2058-9565/aab822/pdf>.
Non-Final Office Action dated May 11, 2022, in U.S. Appl. No. 16/543,165 of Peter D. Johnson, filed Aug. 16, 2019, 26 pages.
Non-Final Office Action dated May 17, 2022, in U.S. Appl. No. 16/662,895 of Eric R. Anschuetz, filed Oct. 24, 2019, 29 pages.
Notice of Allowance dated Apr. 15, 2022, for U.S. Appl. No. 17/174,900 of Yudong Cao, filed Feb. 12, 2021, 10 pages.
Reiher, M., et al., "Elucidating Reaction Mechanisms on Quantum Computers", PNAS, vol. 114, No. 29, pp. 1-28 (2016).
Rolfe, J.T., "Discrete Variational Autoencoders", ICLR, pp. 1-33 (Apr. 22, 2017).
Romero et al., "Quantum autoencoders for efficient compression of quantum data", arXiv:1612.02806v2, Feb. 10, 2017, 11 pages. . [retrieved on Jan. 20, 2020]. Retrieved from <https://arxiv.org/abs/1612.02806>.
Romero, J., and Aspuru-Guzik, A., "Variational quantum generators: Generative adversarial quantum machine learning for continuous distributions", Quantum Physics, arXiv:1901.00848 [quant-ph], pp. 1-15 (Jan. 3, 2019).
Romero, J., et al., "Strategies for quantum computing molecular energies using the unitary coupled cluster ansatz", arXiv:1701.02691v2 [quant-ph], vol. 4, No. 4, pp. 1-18 (Feb. 10, 2018).
Roth, R. M., et al., "Apathy Is Associated with Ventral Striatum Volume in Schizophrenia Spectrum Disorder", J Neuropsychiatry Clin Neurosci, 2016 Summe, vol. 28, No. 3, pp. 1-9 (Published online Feb. 22, 2016. doi: 10.1176/appi.neuropsych.15100241).
Rubin, N. C., et al., "Application of Fermionic Marginal Constraints to Hybrid Quantum Algorithms", New Journal of Physics, vol. 20, No. 5, 053020, pp. 1-21 (2018).
Rubin, N.C., "A Hybrid Classical/Quantum Approach for Large-Scale Studies of Quantum Systems with Density Matrix Embedding Theory", Quantum Physics, arXiv:1610.06910 [quant-ph], pp. 1-10, (2016).
Sanchez-Lengeling, B., and Aspuru-Guzik, A., "Inverse molecular design using machine learning: Generative models for matter engineering", Science 27, vol. 361, No. 6400, pp. 360-365 (Jul. 27, 2018).
Sanchez-Lengeling, B., et al., "Optimizing distributions over molecular space. An Objective-Reinforced Generative Adversarial Network for Inverse-design Chemistry (Organic)", ChemRxiv preprint chemrxiv.5309668.v2, pp. 1-20 (2017).
Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.
Schlittgen, B., et al., "Low-Energy Effective Theories of Quantum Spin and Quantum Link Models", Physical Review D, vol. 63. No. 8, pp. 1-29 (Mar. 19, 2001).
Schuld, M., et al., "Circuit-centric quantum classifiers", arXiv:1804.00633v1, pp. 1-17 (Apr. 2, 2018).
Schuld, M., et al., "Evaluating analytic gradients on quantum hardware", arXiv preprint arXiv:1811.11184v1, pp. 1-8 (2018).
Schuld, M., et al., "Quantum machine learning in feature Hilbert spaces", Quantum Physics, arXiv:1803.07128, pp. 1-12 (Mar. 19, 2018).
Shor, P. W., "Algorithms for quantum computation: Discrete logarithms and factoring", Proceedings 35th Annual Symposium on Foundations of Computer Science (Shafi Goldwasser, ed.), IEEE, pp. 124-134 (1994).

(56) References Cited

OTHER PUBLICATIONS

Sim, S., et al., "A framework for algorithm deployment on cloud-based quantum computers", arXiv preprint arXiv:1810.10576v1, pp. 1-10 (Oct. 24, 2018).
Situ, H., et al., "Quantum generative adversarial network for discrete data", arXiv preprint arXiv:1807.01235v5, pp. 1-22 (2019).
Smith, R. S., et al., "A Practical Quantum Instruction Set Architecture", arXiv preprint arXiv:1608.03355v2, pp. 1-15 (2016).
Soklakov, A. N., and Schack, R., "Efficient state preparation for a register of quantum bits", Phys. Rev. A, 012307, arXiv:quant-ph/0408045v2, vol. 73, No. 1, pp. 1-26 (Nov. 22, 2005).
Spall, J. C., "A one-measurement form of simultaneous perturbation stochastic approximation", Automatica, vol. 33, No. 1, pp. 109-112 (1997).
Spall, J. C., "Adaptive stochastic approximation by the simultaneous perturbation method", IEEE Transactions on Automatic Control, vol. 45, No. 10, pp. 1839-1853 (Oct. 2000).
Spall, J.C., "A Stochastic Approximation Technique for Generating Maximum Likelihood Parameter Estimates", in 1987 American Control Conference, pp. 1161-1167 (1987).
Srednicki, M., "Chaos and quantum thermalization", Phys. Rev. E, vol. 50, No. 2, 888, Aug. 1, 1994, pp. 1-30.
Steiger, D. S., et al., "ProjectQ: An Open Source Software Framework for Quantum Computing", Quantum, arXiv:1612.08091v2, vol. 2, pp. 1-13 (2016).
Steiger, D.S., et al., "Advantages of a modular high-level quantum programming framework," arXiv:1806.01861, pp. 1-11 (Jun. 5, 2018).
Temme, K., et al., "Error Mitigation for Short-Depth Quantum Circuits", Physical review letters, vol. 119, No. 18, 180509, pp. 1-15 (2017).
Valiant, L. G., "Quantum computers that Can Be Simulated Classically in Polynomial Time", SIAM Journal on Computing, vol. 31, No. 4, pp. 1-10 (2002).
Verdon, G., et al., "A quantum algorithm to train neural networks using low-depth circuits", Quantum Physics, arXiv:1712.05304 [quant-ph], pp. 1-9 (Dec. 14, 2017).
Wan, K. H., et al., "Quantum generalisation of feedforward neural networks", npj Quantum Information, vol. 3, Article No. 36, arXiv:1612.01045, pp. 1-8 (2017).
Wang, D., et al., "Accelerated Variational Quantum Eigensolver", arXiv:1802.00171v3, pp. 1-11 (Mar. 25, 2019).
Wang, G., et al., "Minimizing Estimation Runtime on Noisy Quantum Computers," PRX Quantum 2.1 pp. 010346-1-010346-49 (2021).
Wecker, D., et al., "Solving strongly correlated electron models on a quantum computer", Physical Review A, vol. 92, No. 6, pp. 1-27 (2015).
Wecker, D., et al., "Progress towards practical quantum variational algorithms", Phys. Rev. A 92, 042303, pp. 1-11 (Sep. 8, 2015).
Wecker, D., et al., "Towards Practical Quantum Variational Algorithms", Physical Review A, vol. 92, No. 4, 042303, pp. 1-11 (Sep. 8, 2015).
Wendin, G., "Quantum information processing with superconducting circuits: a review", Reports on Progress in Physics, vol. 80, No. 10, pp. 108 (2017).
You, Y., et al., "Machine learning spatial geometry from entanglement features," Phys. Rev. B 97, 045153, pp. 1-15 (Jan. 31, 2018).
Zeng, J., et al., "Learning and Inference on Generative Adversarial Quantum Circuits", arXiv preprint arXiv:1808.02893, vol. 99, No. 5, pp. 1-7 (2018).
Zhao, P., et al., "High-contrast ZZ interaction using superconducting qubits with opposite-sign anharmonicity," arXiv:2002.07560v2, pp. 1-16 (Mar. 27, 2021).
McKinsey & Company, "Quantum Technology Monitor", pp. 1-53 (Jun. 2022).
Non-Final Office Action dated Dec. 6, 2022, in U.S. Appl. No. 16/543,165 of Peter D. Johnson, filed Aug. 16, 2019, 23 pages.
Notice of Allowance dated Jan. 13, 2023 for U.S. Appl. No. 16/600,312, of Jhonatan Romero, filed Oct. 11, 2019, pp. 21.

Gao, N., et al., "High Dimensional Similarity Search with Quantum-Assisted Variational Autoencoder," arXiv:2006.0768v1, Available at URL https://arxiv.org/pdf/2006.07680.pdf, pp. 1-9 (Jun. 13, 2020).
Han, Z., et al., "Unsupervised Generative Modeling Using Matrix Product States," arXiv:1709.01662v3, Available online at URL https://arxiv.org/pdf/1709.01662.pdf, pp. 1-13 (Jul. 19, 2018).
International Search Report and Written Opinion dated Sep. 29, 2022, in PCT patent application No. PCT/US2021/062191, 8 pages.
Niu, M.Y., et al., "Learnability and Complexity of Quantum Samples," arXiv:2010.11983v1. Available at URL < https://arxiv.org/pdf/2010.11983.pdf>, pp. 1-19 (Oct. 22, 2020).
Non-Final Office Action dated Oct. 14, 2022 for U.S. Appl. No. 16/600,312, of Jhonatan Romero, filed Oct. 11, 2019, pp. 61.
Notice of Allowance dated Nov. 4, 2022, in U.S. Appl. No. 16/662,895 of Eric R. Anschuetz, filed Oct. 24, 2019, 51 pages.
Yang, S., et al., "Loop Optimization for Tensor Network Renormalization," arXiv:1512.04938v2, Available online at URL <https://arxiv.org/pdf/1512.04938.pdf>, vol. 118, No. 11, pp. 1-15 (Feb. 25, 2017).
Goodfellow, I., "NIPS 2016 Tutorial: Generative Adversarial Networks", arXiv preprint arXiv:1701.00160v4, pp. 1-57 (2016).
Goodfellow, I., et al., "Deep Learning", Book, vol. 1 (MIT press Cambridge, 2016) available online at http://www.deeplearningbook.org, pp. 1-798.
Grant, E., et al., "Hierarchical quantum classifiers", npj Quantum Information, vol. 4, Article No. 65 ISSN 2056-6387, pp. 1-8 (2018).
Grover, L., and Rudolph, T., et al., "Creating superpositions that correspond to efficiently integrable probability distributions", arXiv preprint quantph/0208112v1, pp. 1-2 (2002).
Guillaume Verdon et al., "Quantum Hamiltonian-Based Models and the Variational Quantum Thermalizer Algorithm," Quantum Physics, arXiv:1910.02071, Oct. 4, 2019, 21 pages.
Guimaraes, G., et al., "Objective-Reinforced Generative Adversarial Networks (ORGAN) for Sequence Generation Models", arXiv preprint arXiv:1705.10843v3, pp. 1-7 (2018).
Handy, N.C., et al., "Size-consistent Brueckner theory limited to double substitutions", Chemical Physics Letters, vol. 164, No. 2-3, pp. 185-192 (Dec. 8, 1989).
Havlicek, V., et al., "Supervised learning with quantum enhanced feature spaces", arXiv:1804.11326v2, pp. 1-22 (Jun. 5, 2018).
He, K., et al., "Deep Residual Learning for Image Recognition", Proceedings of the IEEE conference on computer vision and pattern recognition, pp. 770-778 (2016).
He, Z., et al., "A Conditional Generative Model Based on Quantum Circuit and Classical Optimization", International Journal of Theoretical Physics, vol. 58, pp. 1138-1149 (2019).
Huggins, W., et al., "Towards quantum machine learning with tensor networks", Quantum Science and Technology, arXiv:1803.1153v2, vol. 4, No. 2, pp. 1-12 (Jul. 31, 2018).
International Search Report & Written Opinion dated Jan. 14, 2022, in international patent application No. PCT/US2021/024308, 7 pages.
International Search Report & Written Opinion dated Mar. 29, 2022, in international patent application No. PCT/US2022/012227, 6 pages.
International Search Report and Written Opinion dated Dec. 6, 2019 in PCT International Patent Application No. PCT/US2019/046895, 9 pages.
International Search Report and Written Opinion dated Feb. 10, 2020 in International patent application No. PCT/US2019/057893, 7 pages.
International Search Report and Written Opinion dated Feb. 4, 2020, in International Patent Application No. PCT/US2019/055970, 11 pages.
International Search Report and Written Opinion dated Jun. 7, 2021, in international patent application No. PCT/US2021/017863, 7 pages.
Johnson, P. D., et al., "QVECTOR: an algorithm for device-tailored quantum error correction", arXiv preprint arXiv:1711.02249v1, pp. 1-16 (Nov. 7, 2017).

(56) References Cited

OTHER PUBLICATIONS

Johnson, P. D., et al., "A Method for Improving Quantum Optimization Algorithms: The Marginals Optimization Procedure", ICE 5th Conference on Quantum Information, Spain, (May 28-31, 2019), Book of Abstracts p. 59.

Jordan, P., et al., "In the Collected Works of Eugene Paul Wigner: Part A: The Scientific Papers—Chapter: Über das Paulische Äquivalenzverbot", pp. 109-129. Springer (1993).

Kadurin, A., et al., "DruGAN: An Advanced Generative Adversarial Autoencoder Model for de Novo Generation of New Molecules with Desired Molecular Properties in Silico," Molecular Pharmaceutics 2017, vol. 14, 9, pp. 3098-3104 (Jul. 13, 2017) (Abstract).

Kandala, A., et al., "Extending the computational reach of a noisy superconducting quantum processor", arXiv preprint arXiv:1805.04492v1, pp. 1-10 (2018).

Kandala, A., et al., "Hardware-efficient Variational Quantum Eigensolver for Small Molecules and Quantum Magnets", Nature, vol. 549, pp. 1-24 (2017).

Kaneko, T., and Harada, T., "Noise Robust Generative Adversarial Networks", Cornell University, Available online at [https://arxiv.org/abs/1911.11776v1], Nov. 26, 2019, pp. 1-29.

Kaufman, A.M., et al., "Quantum thermalization through entanglement in an isolated many-body system", Science, vol. 353, No. 6301, Aug. 19, 2016, pp. 794-800.

Kiefer, J., et al., "Stochastic Estimation of the Maximum of a Regression Function", Ann. Math. Statist. vol. 23, No. 3, pp. 462-466 (1952).

Kieferova, M., et al, "Tomography and generative training with quantum Boltzmann machines", Phys. Rev. A, vol. 96, No. 6. 062327, Dec. 22, 2017, pp. 1-2.

Liu, J., and Wang, L., "Differentiable learning of quantum circuit Born machines", Phys. Rev. A 98, 062324, pp. 1-9 (2018).

Liu, Y., "The Complexity of the Consistency and N-Representability Problems for Quantum States", Quantum Physics, arXiv preprint arXiv:0712.3041, pp. 1-89 (2007).

Liu, Y., et al., "Quantum computational complexity of the N-representability problem: QMA complete", Physical review letters, vol. 98, No. 11, pp. 1-6 (2007).

Lloyd, S., "Universal Quantum Simulators", Science, vol. 273, No. 5278, pp. 1073-1078 (Aug. 23, 1996).

Lloyd, S., and Weedbrook, C., "Quantum Generative Adversarial Learning", Phys. Rev. Lett. vol. 121, No. 4, pp. 040502-1-040502-5 (2018).

Lloyd, S., et al., "Quantum embeddings for machine learning," https://arxiv.org/abs/2001.03622, pp. 1-11 (Feb. 10, 2020).

Plesch, M., and Brukner, C., "Quantum-State Preparation with Universal Gate Decompositions", Phys. Rev. A 83, arXiv:1003.5760v2, 032302, pp. 1-5 (Mar. 4, 2011).

Mandra, S., et al., "Strengths and weaknesses of weak-strong cluster problems: A detailed overview of state-of-the-art classical heuristics versus quantum approaches", Phys. Rev. A, vol. 94, No. 6, 022337, Aug. 29, 2016, pp. 1-14.

McClean, J. R., et al., "Barren plateaus in quantum neural network training landscapes", Nature Communications, vol. 9, pp. 1-6, 2018.

McClean, J. R., et al., "The theory of variational hybrid quantum-classical algorithms", New Journal of Physics, vol. 18, pp. 1-22 (Feb. 5, 2016).

McClean, J.R., et al., "Hybrid Quantum-Classical Hierarchy for Mitigation of Decoherence and Determination of Excited States", Physical Review A, vol. 95, No. 4, pp. 1-10 (2017).

Mescheder, L., et al., "Which Training Methods for GANs do actually Converge?", International Conference on Machine Learning, pp. 1-39 (2018).

Mitarai, K., et al., "Quantum Circuit Learning", Phys. Rev. A 98, 032309, DOI:10.1103/PhysRevA.98.032309, arXiv:1803.00745 [quant-ph], pp. 1-7 (2019).

Motta, M., et al., "Low rank representations for quantum simulation of electronic structure", Computational Physics, Quantum Physics, arXiv:1808.02625v2, pp. 1-8 (Aug. 9, 2018).

Niemann, P., et al., "Logic Synthesis for Quantum State Generation", 2016 IEEE 46th International Symposium on Multiple-Valued Logic (ISMVL), Sapporo, pp. 247-252 (2016).

Panahi, A., et al., "word2ket: Space-efficient Word Embeddings inspired by Quantum Entanglement," International Conference on Learning Representations 2020, arXiv:1911.04975, pp. 1-10 (Mar. 3, 2020).

Paszke, A., et al., "Automatic differentiation in PyTorch", 31st Conference on Neural Information Processing Systems Long Beach, CA, USA, pp. 1-4 (NIPS 2017).

Perdomo-Ortiz, A., et al., "Opportunities and challenges for quantum-assisted machine learning in near-term quantum computers", Quantum Science and Technology, vol. 3, No. 3, pp. 1-14 (2018).

Peruzzo, A., et al., "A variational eigenvalue solver on a photonic quantum processor", Nature Communications, vol. 5, Article No. 4213, pp. 1-7 (2014).

Preskill, J., "Quantum Computing in the NISQ era and beyond", arXiv preprint arXiv:1801.00862v3, pp. 1-20 (Jul. 31, 2018).

Purvis, G.D., et al., "A full coupled-cluster singles and doubles model: The inclusion of disconnected triples", The Journal of Chemical Physics, vol. 76, No. 4, pp. 1910-1918 (Feb. 15, 1982).

Quantum Information Software Kit (QISKit), https://qiskit.org/ (2018).

Radford, A., et al., "Unsupervised Representation Learning with Deep Convolutional Generative Adversarial Networks", arXiv preprint arXiv:1511.06434, pp. 1-16 (2015).

Aaronson, S., and Chen, L., "Complexity-Theoretic Foundations of Quantum Supremacy Experiments", arXiv:1612.05903v2, pp. 1-66 (Dec. 26, 2016).

Abadi, M., et al., "TensorFlow: Large-Scale Machine Learning on Heterogeneous Distributed Systems", pp. 1-19 (Preliminary White Paper, Nov. 9, 2015), software available from tensorflow.org, http://tensorflow.org/.

Ackley, D.H., et al., "A Learning Algorithm for Boltzmann Machines", Cognitive Science, vol. 9, No. 1, pp. 147-169 (1985).

Amin, M.H., et al., "Quantum Boltzmann Machine", Phys. Rev. X 8, 021050 URL:https://arxiv.org/abs/1601.02036, vol. 8, No. 8, Jan. 8, 2016, pp. 1-10.

Amin, M.H., et al., "Quantum Boltzmann Machine", Physical Review X, vol. 8, No. 1, Available online https://journals.aps.org/prx/abstract/10.1103/PhysRevX.8.021050, pp. 021050-1-021050-11 (May 23, 2018).

Anschuetz, E.R., and Cao, Y., "Realizing Quantum Boltzmann Machines Through Eigenstate Thermalization," arXiv preprint, arXiv:1903.01359 [quant-ph], pp. 1-30 (Mar. 4, 2019).

Anschuetz, E.R., and Zanoci, C., "Near-Term Quantum-Classical Associative Adversarial Networks", Phys. Rev. A, URL: https://arxiv.org/abs/1905.13205, vol. 100, No. 5, 052327, pp. 1-11 (2019).

Aspuru-Guzik, A., et al., "Simulated Quantum Computation of Molecular Energies", Science, Quantum Physics, vol. 309, No. 5741, pp. 1-21 (Sep. 9, 2005).

Aspuru-Guzik, A., et al., "The Matter Simulation (R)evolution", ACS Cent. Sci., 4, 2, pp. 144-152 (2018).

Bach, V., et al., "Generalized Hartree-Fock Theory and the Hubbard Model", Journal of Statistical Physics, vol. 76 (1-2):3-89, pp. 1-68 (Nov. 25, 1993).

Barahona, F., "On the computational complexity of Ising spin glass models", Journal of Physics A: Mathematical and General, vol. 15, No. 10, pp. 3241-3253 (1982).

Baydin, A. G., et al., "Automatic Differentiation in Machine Learning: a Survey", Journal of Machine Learning Research, vol. 18, No. 1, pp. 1-43 (2018).

Benedetti, M., et al., "A generative modeling approach for benchmarking and training shallow quantum circuits", arXiv preprint arXiv:1801.07686v4, pp. 1-16 (Jun. 2, 2019).

Benedetti, M., et al., "Estimation of effective temperatures in quantum annealers for sampling applications: A case study with possible applications in deep learning", Phys. Rev. A, vol. 94, No. 2, 022308, Aug. 9, 2016, pp. 1-15.

Benedetti, M., et al., "Quantum-assisted Helmholtz machines: A quantum-classical deep learning framework for industrial datasets in near-term devices", Quantum Physics, ArXiv 1708.09784v3, pp. 1-11 (Mar. 19, 2018).

(56) References Cited

OTHER PUBLICATIONS

Bengio, Y., et al., "Greedy layer-wise training of deep networks", NIPS'06: Proceedings of the 19th International Conference on Neural Information Processing Systems, pp. 1-8 (Dec. 2006).

Bergholm, V., et al., "PennyLane: Automatic differentiation of hybrid quantumclassical computations", arXiv preprint arXiv:1811.04968v3, pp. 1-15 (2018).

Besnier, V., et al., "This Dataset Does Not Exist: Training Models From Generated Images", Available online at [https://arxiv.org/abs/1911.02888, Nov. 7, 2019, pp. 1-6.

Biamonte, J., et al., "Quantum machine learning", Nature 549, pp. 195-292 (2016).

Biamonte, J.D., et al., "Realizable Hamiltonians for universal adiabatic quantum computers", Phys. Rev. A, vol. 78, No. 1, 012352, pp. 1-7 (2008).

Bogoljubov, N.N., "A New Method in the Theory of Superconductivity", Soviet Physics JETP, vol. 34, No. 7, pp. 41-46 (Jul. 1958).

Boixo, S., et al., "Characterizing Quantum Supremacy in Near-Term Devices", Nature Physics, vol. 14, pp. 595-600 (2018).

Bonet-Monroig, "Comparison of Error mitigation Strategies in a Hydrogen Molecule Quantum Simulation", Master thesis. Leiden University, pp. 1-52 (May 29, 2018).

Brassard, G., et al., "Quantum Amplitude Amplification and Estimation", arXiv:quant-ph/0005055v1, pp. 1-22 (May 15, 2000).

Bravyi, L. D., et al., "Fermionic Quantum Computation", Annals of Physics, vol. 298, No. 1, pp. 210-226 (2002).

Cao, Y., et al., "Quantum Neuron: an elementary building block for machine learning on quantum computers", arXiv:1711.11240v1, pp. 1-30 (2017).

Chen, H., et al., "Universal discriminative quantum neural networks", arXiv preprint arXiv:1805.08654v1, pp. 1-19 (May 22, 2018).

Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).

Cirq, https://github.com/quantumlib/Cirq, Available online, copyright 2019, 2 pages.

Colless, J.I., et al., "Computation of Molecular Spectra on a Quantum Processor with an Error-Resilient Algorithm", Physical Review X, vol. 8, No. 1, pp. 011021-011027 (2018).

Creswell, A., et al., "Generative Adversarial Networks: An Overview", IEEE Signal Processing Magazine, vol. 35, No. 1, pp. 1-14 (2017).

D'Alessio, L., et al., "From quantum chaos and eigenstate thermalization to statistical mechanics and thermodynamics", Advances in Physics, vol. 65, No. 3, pp. 1-130 (2016).

Dallaire-Demers, P.L., and Killoran, N., "Quantum generative adversarial networks", arXiv:1804.08641v2, Phys. Rev. A, vol. 98, 012324, pp. 1-10 (Apr. 30, 2018).

Dallaire-Demers, P.L., et al., "Low-depth circuit ansatz for preparing correlated fermionic states on a quantum computer", Quantum Physics, arXiv:1801.01053v1 , pp. 1-15 (Jan. 3, 2018).

Dankert, C., et al., "Exact and approximate unitary 2-designs and their application to fidelity estimation", Physical Review A, vol. 80, No. 1, 012304, pp. 1-7 (Jul. 2009).

Deutsch, J.M., "Quantum statistical mechanics in a closed system", Phys. Rev. A, vol. 43, No. 4, pp. 2046-2049 (Feb. 15, 1991).

Du, Y., et al., "The Expressive Power of Parameterized Quantum Circuits", arXiv preprint arXiv:1810.11922V1, pp. 1-15 (2018).

Endo, S., et al., "Practical Quantum Error Mitigation for Near-Future Applications", Phys. Rev. X, vol. 8, 031027-1-031027-21 (2018).

Endo, S., et al., "Variational quantum algorithms for discovering Hamiltonian spectra", Physical Review A, arXiv preprint arXiv:1806.05707, pp. 1-9 (2018).

Extended European Search Report dated Dec. 7, 2021, in European patent application 19871859.5, 14 pages.

Extended European Search Report dated Dec. 7, 2021, in European patent application 19874946.7, 11 pages.

Farhi, E., and Neven, H., "Classification with Quantum Neural Networks on Near Term Processors", arXiv preprint arXiv:1802.06002v2, pp. 1-21 (Aug. 30, 2018).

Farhi, E., et al., "A quantum approximate optimization algorithm", Quantum Physics, arXiv:1411.4028v1, pp. 1-16 (Nov. 14, 2014).

Garcia-Saez, A., et al., "Local Temperature in Quantum Thermal States", vol. 79, No. 5, arXiv: 0808.0102v2, pp. 1-10 (Jun. 2, 2009).

Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).

Garrison, J.R., et al., "Does a Single Eigenstate Encode the Full Hamiltonian?" Physical Review X, vol. 8, No. 2, pp. 021026-1-021026-24 (2018).

Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).

Gómez-Bombarelli, R., et al., "Automatic Chemical Design Using a Data-Driven Continuous Representation of Molecules", ACS Cent. Sci., vol. 4, No. 2, pp. 268-276 (2018).

Goodfellow, I. J., et al., "Generative adversarial nets", in Advances in neural information processing systems, pp. 1-9 (2014).

Goodfellow, I. J., et al., "Generative Adversarial Networks", arXiv:1406.2661v1 [stat.ML], 2014, pp. 1-9 (Jun. 10, 2014).

Final Office Action dated Aug. 25, 2022, in U.S. Appl. No. 16/543,165 of Peter D. Johnson, filed Aug. 16, 2019, 73 pages.

* cited by examiner

REPRESENTATIONS OF WORD EMBEDDING IN N-VECTOR SPACE

QUANTUM ENHANCED WORD EMBEDDING FOR NATURAL LANGUAGE PROCESSING

BACKGROUND

Field of the Technology Disclosed

The disclosed technology generally relates to computer-implemented methods, systems, and computer programs for natural language processing (NLP). More particularly, the disclosed technology relates to a method, system, and computer program for quantum-enhanced word embedding using a hybrid quantum-classical computer.

Description of Related Art

The subject matter discussed in this section should not be assumed to be prior art merely as a result of its mention in this section. Similarly, any problems or shortcomings mentioned in this section or associated with the subject matter provided as background should not be assumed to have been previously recognized in the prior art. The subject matter in this section merely represents different approaches, which in and of themselves can also correspond to implementations of the claimed technology.

Natural Language Processing (NLP) is concerned with computer processing and analyzing large amounts of natural language data, with the purpose of better understanding human language and its interactions. Human language generally consists of words and sentences, and NLP attempts to extract information from these sentences. Words have associations with other words, and these associations can be classified as both semantic (related to its meaning) and a contextual relationship (related to its proximity to other words).

In natural language processing, the term word embedding refers to a method of text analysis in which words or word pairs are plotted in vector space so that words with similar semantic relationships and meanings are positioned closer in vector space.

Currently, many of the techniques of NLP involve machine learning methods, which are used to extract similar features from sample text. The size of the vector is equal to the number of elements in the vocabulary. A method known as "word2vec" requires a huge amount of training data associated with a vocabulary or a dictionary. These vocabularies and dictionaries often involve more than 100,000 words, and possibly much more. The object is to map all the words into vector space while preserving semantic relationships.

While some approaches to classifying words, such as bag of words (BOW), do not preserve semantic relationships, current word embedding methods such as word2vec place vectors of semantically similar items close to each other. Semantic similarity means that words with similar meaning have similar distances in vector space. A commonly used example is: king is to queen, as man is to woman. It is desirable, when words are mapped in vector space, that the distance metric between words with similar meaning will be minimized, thus preserving the semantic relationship between those words. Similarly, the distance metric between tenses of verbs will be minimized. A further example would be the encoding of countries, capital cities, and major cities. These are semantically similar and would advantageously be mapped with minimal distance metrics in vector space. Also, words that are analogically similar or have another known associations would be encoded to minimize distance metrics.

Word embedding has many practical uses, which will not be discussed here in any depth. For one example, recommendation engines may predict what a user would purchase based on historical purchases of other users with similar interests. This method is generally known as collaborative filtering, where similar products bought by multiple customers are embedded into neighboring vector space. Using methods such as nearest neighbor algorithms, similar products will be placed next to semantically similar items in vector space.

As the number of individual words to be classified increases according to the principles of word embedding, conventional methods of deep learning become increasingly costly in terms of required time and processing power. This is particularly true when performing word embedding for large vocabularies (100,000 words or more).

SUMMARY

The disclosed technology uses quantum computing technology to provide a solution to the challenges described above. The disclosed technology includes a method and system for generating a word embedding using quantum-assisted technology. Some particular implementations and features are described in the following discussion. The disclosed method for generating a word embedding is performed on a hybrid quantum-classical computer system, which may include both a classical computer component and a quantum computer component. The classical computer component includes a processor, a non-transitory computer-readable medium, and computer instructions stored in the non-transitory computer-readable medium. The quantum computer component includes a plurality of qubits, and accepts a sequence of instructions to evolve a quantum state based on a series of quantum gates.

When the computer instructions are executed, the hybrid quantum-classical computer performs a method for generating a word embedding for at least one pair of words. The classical computer includes a training set of training samples comprising (1) a word pair set, the word pair set comprising N pairs of words, wherein N≥1, and (2) for each pair of words P in the word pair set, a numerical value $B_P$ indicating a classical correlation between the words in the pair of words P.

In one embodiment, the disclosed word embedding method generates, on the quantum computer, a plurality of quantum state representations including one quantum state representation for at least one word in the word pair set. A quantum correlation is trained between (1) words in a word pair X in the pairs of words on the quantum computer using an error function, (2) the numerical value $B_X$ corresponding to the word pair X, and (3) the plurality of quantum state representations, the word embedding including the quantum correlation.

In another aspect, the method of training uses an engineered likelihood function to train the quantum correlation. The engineering likelihood function may be implemented as a parameterized quantum circuit. Also, the method of training may use Bayesian inference to train the quantum correlation.

The disclosed method is particularly applicable to large dictionaries or vocabularies of words, which can typically exceed 100,000, and may be multiples of 100,000 (e.g., greater than 200,000, greater than 500,000, and greater than 1,000,000). As previously stated, as the number of individual words to be classified increases according to the principles of word embedding, conventional methods of deep learning are very costly in terms of required time and classical processing power. This is particularly true when performing word embedding for large vocabularies (100,000 words or more). The disclosed quantum computing method for a hybrid quantum-classical computer can overcome these drawbacks by training quantum correlations.

In another aspect, the training set may include a set of triples (x, y, b). For each of the triples T: (1) x and y in triple T are two words in a corresponding pair of words in the word set, and (2) b in triple T is a binary value indicating whether the two words in the corresponding pair of words are semantically correlated. In one aspect of the disclosed method, for each pair of words P in the word pair set, the numerical value $B_P$ comprises a binary value indicating whether the words in the pair of words P are semantically correlated.

The disclosed method may incorporate in the training set the use of the "skip-gram with negative sampling" method. Also, the training of the quantum correlation may use quantum amplitude estimation. This is particularly useful in noisy intermediate-scale quantum (NISQ) environments, which may have limited fault tolerance. All the above disclosed methods and concepts for quantum-assisted word embedding are useful in natural language processing (NLP) applications.

In another embodiment of the disclosed technology the level of association between each pair of words is determined by a distance metric. Also, the distance metric may be represented by a function of at least one quantum state. In a further aspect, the correlation between word pairs is a semantic correlation related to the meaning of the words in the word pair. For example, the words "man" and "woman" are semantically correlated as to gender. The tenses of verbs may be related in this way. In another aspect, the correlation between word pairs is a contextual correlation, having to do with the proximity of word pairs as found in sentences and textual expressions of language.

In a further aspect, the training may include evaluating each word pair using the SWAP test. In another aspect, the training may include testing the word embedding using overlap estimation.

In one embodiment, the method includes generating, on the quantum computer, the plurality of quantum state representations including one quantum state representation for each of the words in the N pairs of words in the word pair set. Also, the method may further comprise repeating the training for each word pair in the N pairs of words. As previously stated, the number of word pairs (N-pairs) may exceed 100,000 in the case of large vocabularies, dictionaries, and lexicons.

In another embodiment, the disclosed technology is a hybrid quantum-classical computer system for generating a word embedding. The system includes a classical computer and a quantum computer. The classical computer includes a processor, a non-transitory computer-readable medium, and computer instructions stored in the non-transitory computer-readable medium. The quantum computer includes a quantum component, having a plurality of qubits, which accepts a sequence of instructions to evolve a quantum state based on a series of quantum gates. The computer instructions, when executed by the processor, perform a method for generating, on the hybrid quantum-classical computer, a word embedding for at least one pair of words. The classical computer includes a training set of training samples comprising (1) a word pair set, the word pair set comprising N-pairs of words, wherein N≥1, and (2) for each pair of words P in the word pair set, a numerical value $B_P$ indicating a classical correlation between the words in the pair of words P. The method for generating a word embedding includes generating, on the quantum computer, a plurality of quantum state representations including one quantum state representation for at least one word in the word pair set; and training a quantum correlation between (1) words in a word pair X in the pairs of words on the quantum computer using an error function, (2) the numerical value $B_X$ corresponding to the word pair X, and (3) the plurality of quantum state representations, the word embedding including the quantum correlation.

In another aspect of the disclosed system, the method of training uses an engineered likelihood function to train the quantum correlation. The engineering likelihood function may be implemented as a parameterized or parametrized quantum circuit. Also, the method of training may use Bayesian inference to train the quantum correlation. Because of its quantum component, the disclosed system is applicable to training large sets of N-pairs, where N>100,000 (e.g., N>200,000, N>300,000, N>500,000, or N>1,000,000).

In another aspect of the disclosed system, the training set may include a set of triples (x, y, b). For each of the triples T (1) x and y in triple T are two words in a corresponding pair of words in the word set, and (2) b in triple T is a binary value indicating whether the two words in the corresponding pair of words are semantically correlated. In one aspect of the disclosed system, for each pair of words P in the word pair set, the numerical value $B_P$ comprises a binary value indicating whether the words in the pair of words P are semantically correlated. The system may generate, on the classical computer, the training set using the "skip-gram with negative sampling" method. Also, the training of the quantum correlation may use quantum amplitude estimation, particularly useful for noisy intermediate-scale quantum (NISQ) environments. The disclosed system, methods, and concepts for quantum-assisted word embedding are useful in natural language processing (NLP) applications.

In the disclosed system, the level of association between each pair of words may be determined by a distance metric. Also, the distance metric may be represented by a function of at least one quantum state. In a further aspect, the correlation between word pairs is a semantic correlation related to the meaning of the words in the word pair. For example, the words "man" and "woman" are semantically correlated as to gender. The tenses of verbs may be related in this way. In another aspect, the correlation between word pairs is a contextual correlation, having to do with the proximity of word pairs as found in sentences and textual expressions of language.

In a further aspect of the disclosed system, the training may include evaluating each word pair using the SWAP test. In another aspect, the training may include testing the word embedding using overlap estimation. In one embodiment, the method includes generating, on the quantum computer, the plurality of quantum state representations including one quantum state representation for each of the words in the N pairs of words in the word pair set. Also, the method may further comprise repeating the training for each word pair in the N pairs of words. As previously stated, the number of word pairs (N-pairs) may exceed 100,000 in the case of large vocabularies, dictionaries, and lexicons.

BRIEF DESCRIPTION OF THE DRAWINGS

The disclosed technology, as well as a preferred mode of use and further objectives and advantages thereof, will best be understood by reference to the following detailed description of illustrative embodiments when read in conjunction with the accompanying drawings. In the drawings, like reference characters generally refer to like parts throughout the different views. The drawings are not necessarily to scale, with an emphasis instead generally being placed upon illustrating the principles of the technology disclosed.

DETAILED DESCRIPTION

Natural language processing (NLP) is a field of machine learning which has gained tremendous importance in the recent years. Central to many algorithms in NLP is the concept of word embedding, where each word x in a given dictionary of a language is mapped to a vector representation $\vec{v}_x$. The quality of such representation can often be engaged by testing whether a certain analogy relationship holds. An example of such an analogy would be "king: man=queen: woman", for which a good word embedding should approximately satisfy $\vec{v}_{king} - \vec{v}_{man} + \vec{v}_{woman} \approx \vec{v}_{queen}$.

In natural language processing, the term word embedding refers to a method of text analysis in which words or word pairs are plotted in vector space. Words with similar semantic relationships are positioned closer in vector space and are expected to be similar in meaning. The process involves mapping words into vector space so that pairs of related words preserve semantic relationships.

Figure 4:
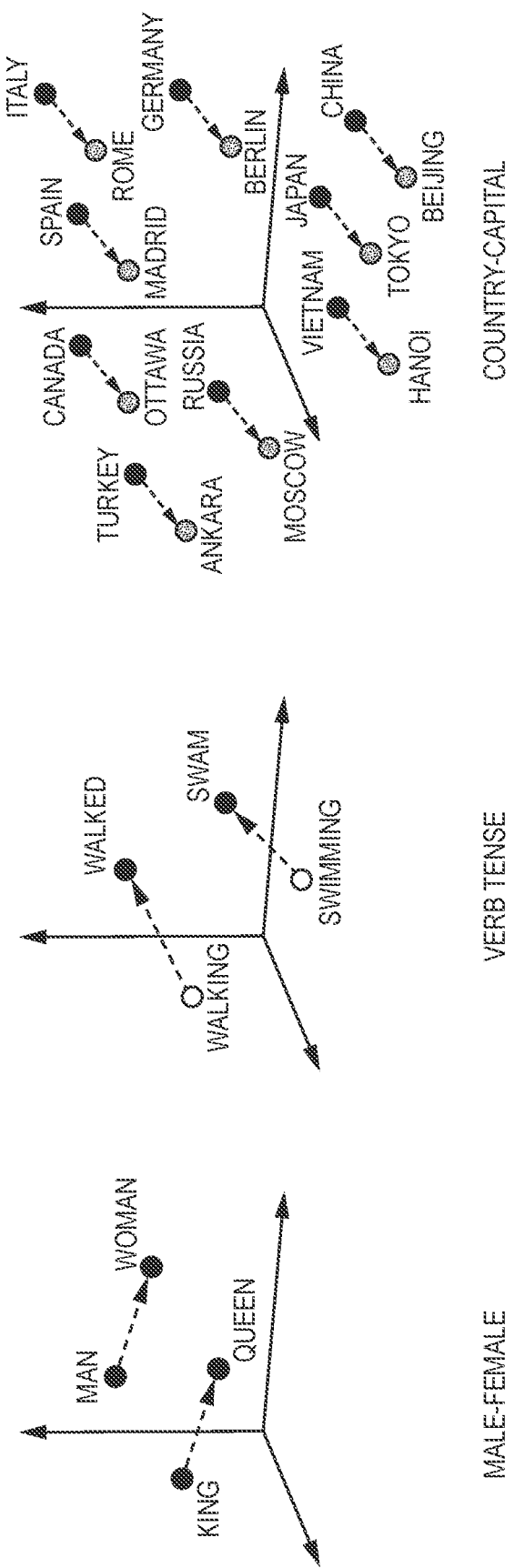
FIG. 4 illustrates the concept of word embedding in n-dimensional vector space.

Referring to FIG. 4, these concepts are illustrated. Pairs of words are mapped into vector space so that word pairs that are related are closely mapped. Another way of saying this is that words that are related in meaning are mapped closely together in vector space. That is, they have a small metric distance. In the first drawing, the word pairs man-woman and king-queen are related semantically, denoting the relationship between male-female and their corresponding gender roles. These word pairs have been mapped in vector space with a minimal metric distance separating them.

Continuing with FIG. 4, in the middle illustration, the word pairs walked-walking and swam-swimming are related semantically by their meaning, in this case verb tense, as variations in the same semantic definitions. In the third illustration of FIG. 4, pairs of words are related to the concept of country-capital. Therefore, as an example, Italy is mapped in vector space with a minimum metric distance from Rome, and Russia is mapped in vector space with a minimum metric distance from Moscow.

Currently, many of the techniques of NLP involve machine learning methods, which are used to extract similar features from sample text. The size of the vector is equal to the number of elements in the vocabulary. Other approaches include more sophisticated deep learning methods. A method known as "word2vec" requires a huge amount of training data to be associated with the vocabulary contained in a dictionary. These vocabularies comprise dictionaries often involving more than 100,000 words, or even several hundred thousand words.

For common NLP tasks, such as sentimentality analysis and next word prediction (as implemented on many smartphone devices), a well-trained word embedding can serve as an advantageous starting point for more detailed natural language processing (NLP). In addition to the vector representations themselves, of equal importance is the distance metric used for evaluating the level of association between two words.

Quantum computers offer possibilities of carrying out computations that are beyond the capabilities of classical computers, particularly for higher word-count applications. The present technology makes it possible to generate quantum state representations of large dictionaries of words, which are difficult for classical computers. The present technology also provides a way to efficiently implement distance metrics between words, as represented by quantum states, that are, once again, beyond the capabilities of classical computers.

Embodiments of the present invention use quantum computers for generating word representation, which may represent high-rank entangled states efficiently. Such embodiments include methods for efficiently computing inner products. In addition, embodiments of the present invention may use methods for quantum amplitude estimation that are more efficient and suitable for noisy intermediate-scale quantum (NISQ) environments.

Embodiments of the present invention may use word embedding for NLP applications, where the algorithm design may take into account the sequential nature of natural language data. Embodiments of the present invention include methods for efficiently computing inner products.

The Word Embedding System and Method

The disclosed technology includes a method and system for generating a word embedding. The disclosed method and system for generating a word embedding may be implemented on a hybrid quantum-classical computer system, which includes both a classical computer component and a quantum computer component, such as the hybrid quantum-classical computer 300 of FIG. 3. The classical computer component (e.g., the classical computer 306 of FIG. 3) includes a processor, a non-transitory computer-readable medium, and computer instructions stored in the non-transitory computer-readable medium. The quantum computer component (e.g., the quantum computer 102 of FIGS. 1 and 3) includes a plurality of qubits, and accepts a sequence of instructions to evolve a quantum state based on a series of quantum gates.

Figure 5:
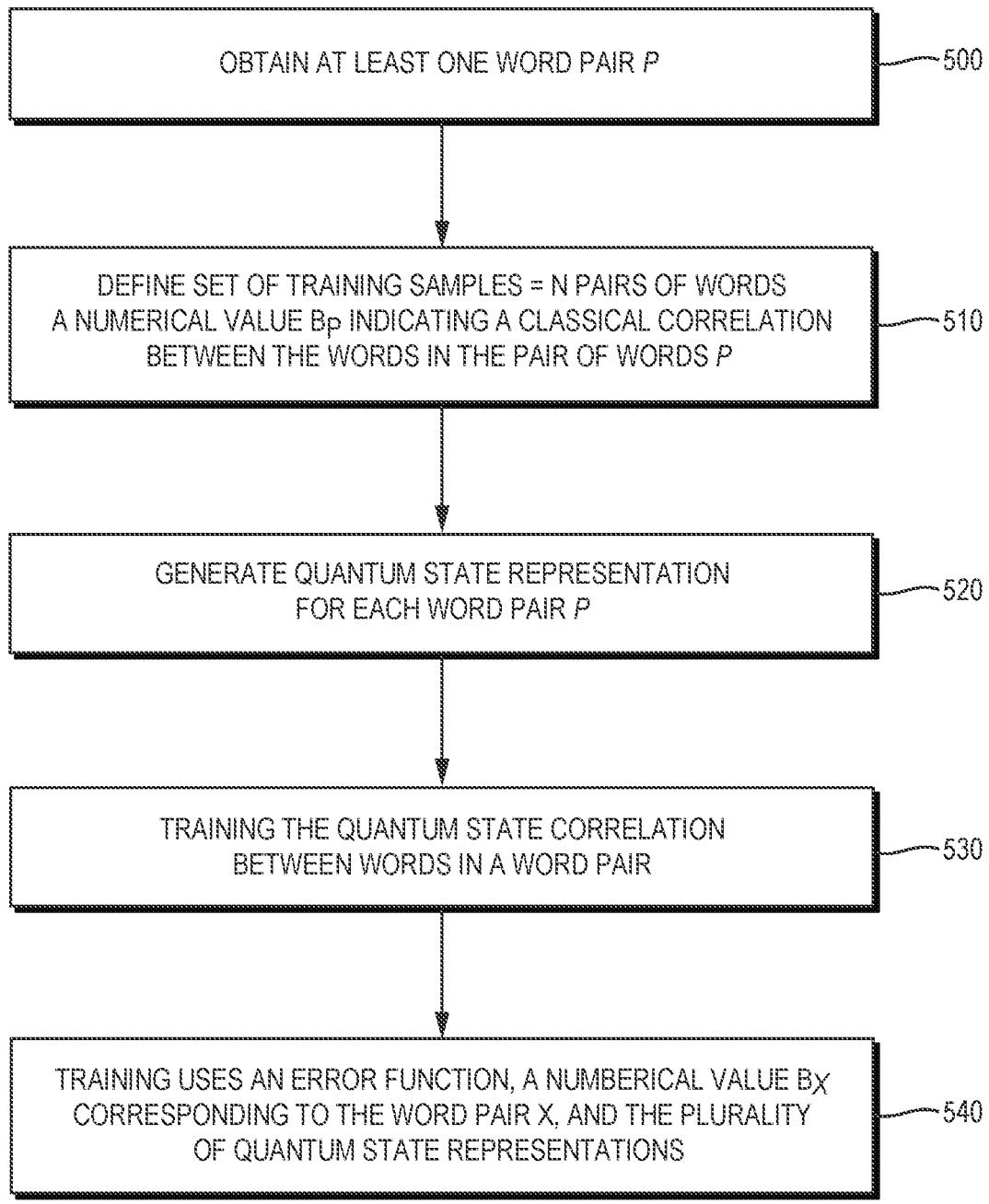
FIG. 5 illustrates as a block diagram the data flow of the disclosed method for quantum-assisted word embedding.

Referring to FIG. 5, when computer instructions are executed, the hybrid quantum-classical computer performs a method for generating a word embedding for at least one pair of words 500. The classical computer includes a training set of training samples (FIG. 5, operation 510) comprising (1) a word pair set, the word pair set comprising N pairs of words, wherein N≥1, and (2) for each pair of words P in the word pair set, a numerical value $B_P$ indicating a classical correlation between the words in the pair of words P. The disclosed word embedding method generates (FIG. 5, operation 520), on the quantum computer, a plurality of quantum state representations including one quantum state representation for at least one word in the word pair set. A quantum correlation is trained (FIG. 5, operation 530) between (1) words in a word pair X in the pairs of words on the quantum computer using an error function, (2) the numerical value $B_X$ corresponding to the word pair X, and (3) the plurality of quantum state representations, the word embedding including the quantum correlation (FIG. 5, operation 540). The method may use an engineered likelihood function to train the quantum correlation, such as an engineered likelihood function implemented as a parameterized quantum circuit. The method of training may use a Bayesian inference to train the quantum correlation.

Generating a Training Set

To generate a word embedding that captures the sematic correlations between words in a vocabulary, embodiments of the present invention may start by generating a training set consisting of a list of triples (x, y, b). Here x and y may be words and b may be a numerical value, such as a binary value indicating whether the two words are semantically correlated.

Skip-Gram Method

One way of generating such a training set is the so-called "skip gram with negative sampling" method. Skip gram with negative sampling is a method where, for a block of text, a sliding window is applied spanning a certain number of words through the text. For a given window position, let w be a word inside the window and $\vec{v}$ be the rest of the words in the window. The elements in $\vec{v}$ are words that are both preceding and succeeding w. Then $(v_i, w, 1)$ is added to the training set for all $v_i$ in $\vec{v}$. The window is then advanced one word down the text and the same process is repeated. This way the training set generated consists of only those elements where b is 1.

As part of this method, it may also be desirable to generate negative samples where x and y are uncorrelated. This is accomplished simply by going through the $(v_i, w, 1)$ training samples generated previously and for each w, choosing a set of random words R from the dictionary, which are most likely semantically uncorrelated with w, and adding (r, w, 0) to the training set for each r in R.

Defining the Parametrized Word Embedding

Figure 6:
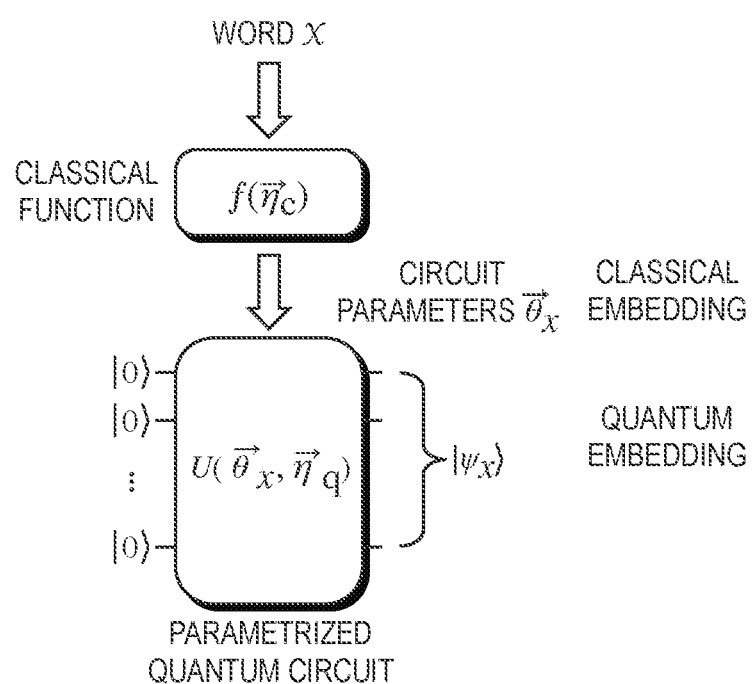
FIG. 6 illustrates the concept of parameterized word embedding starting with defining a training set followed by generating quantum state representations.

Once the training set is defined, the next step is to specify the parametrized word embedding. FIG. 6 illustrates that for each word x a quantum state representation $|\psi_x\rangle$ may be generated with tunable classical functions and quantum circuits. The classical function may be a pre-trained classical word embedding, in which case the quantum component (combined with the overlap estimation part which will be described further on) serves as an enhancement to the classical model.

FIG. 6 illustrates schematically the word embedding scheme. Here and $\vec{\eta}_c$ and $\vec{\eta}_q$ are tunable parameters for the classical function and the quantum circuit respectively. The vector $\vec{\theta}_x$ can be considered as an embedding by itself and used for other NLP applications as it is. To capture correlations quantum mechanically, an additional step is performed to generate the quantum embedding $|\psi_x\rangle$.

The SWAP Test

For two words x and y with quantum representations $|\psi_x\rangle$ and $|\psi_y\rangle$, one could evaluate their correlation $\langle \psi_x|\psi_y\rangle$ by variants of the SWAP test, which costs $O(1/\epsilon^2)$ repetitions of the quantum circuit if one were to estimate the correlation to error $\epsilon$. One can in principle accelerate this quadratically to a cumulative runtime of $O(1/\epsilon)$ by $O(1/\epsilon)$ amount of quantum coherence time in each repetition, which becomes quickly impractical for noisy quantum devices.

Instead, embodiments of the present invention may use a method that naturally interpolates between the two regimes and derives as much quantum speedup as is feasible on a noisy device. In particular, for noise parameter λ, it is advantageous to implement quantum circuits of depth $O(1/\lambda)$ repeating $O(\lambda^2/\epsilon^2)$ times to yield a cumulative runtime of $O(\lambda/\epsilon^2)$. Better performing devices have a smaller value of λ, affording shorter estimation runtimes.

Engineered Likelihood Function

Figure 7:
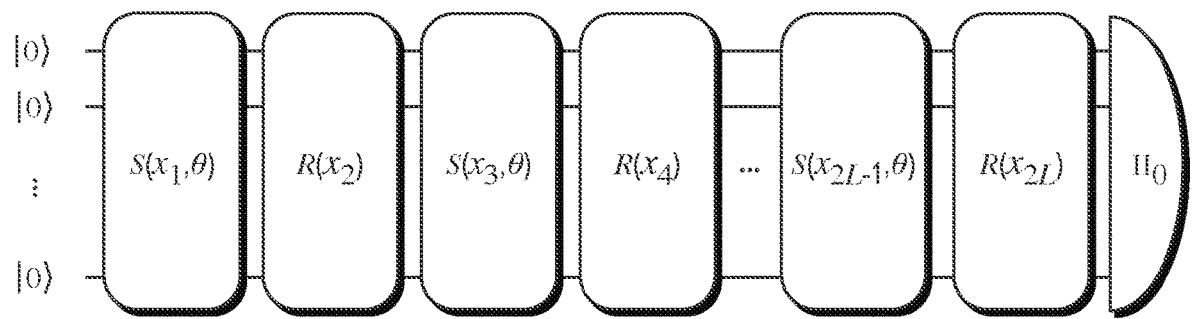
FIG. 7 illustrates the parameterized circuit for implementing the engineered likelihood function (ELF)
Figure 8:
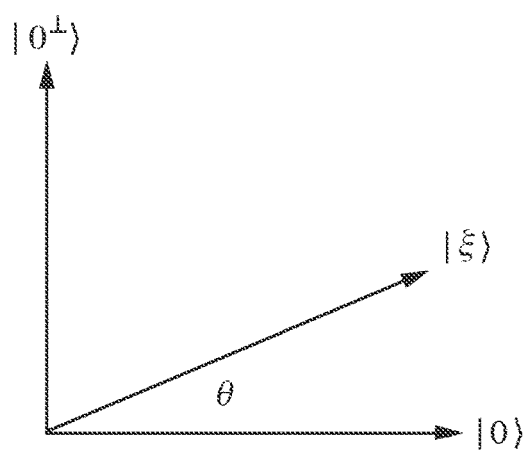
FIG. 8 illustrates, as part of the engineered likelihood function (ELF), the geometric interpretation of θ as an angle parameter between $|0\rangle$ and $|\xi\rangle = V^\dagger W|0\rangle$.

FIG. 7 and FIG. 8 illustrate evaluating $\langle 0|V^\dagger W|0\rangle$ using engineered likelihood function. The problem of evaluating $\langle \psi_x|\psi_y\rangle$ essentially reduces to estimating overlaps of the form $\langle 0|V^\dagger W|0\rangle$ where V and W are unitary operations performed by some coherent quantum mechanical process. Let θ be such that $\cos \theta = \langle 0|V^\dagger W|0\rangle$. A central object that needs to be constructed is an engineered likelihood function (ELF), $p(d|\theta, \vec{x})$, where d is a measurement outcome from executing a quantum process and $\vec{x}$ are tunable parameters. Here we realize the ELF by executing the quantum circuit in FIG. 7 and performing a measurement as a final step.

Figure 3:
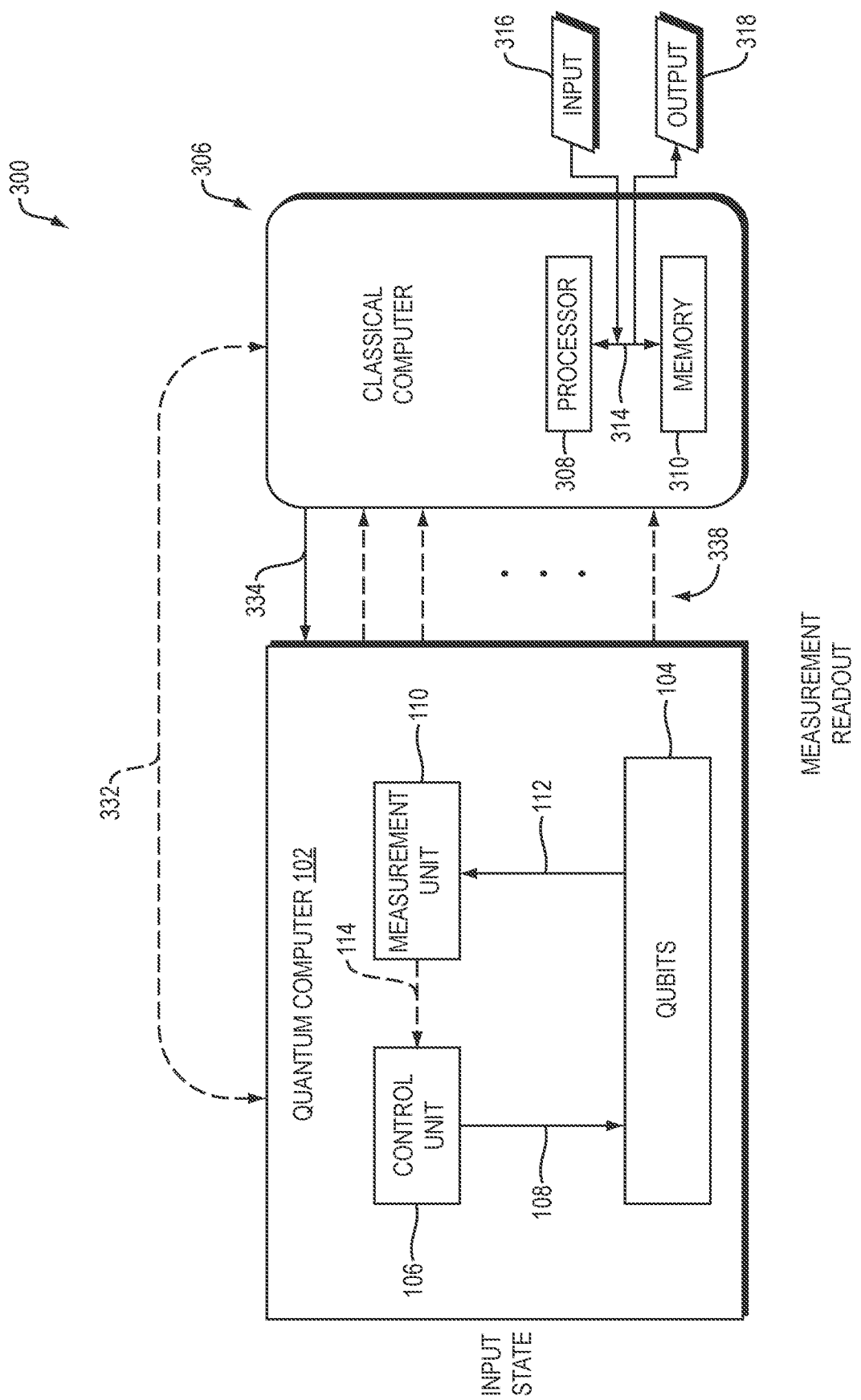
FIG. 3 is a diagram of a hybrid quantum-classical computer according to one embodiment of the present invention.

FIG. 7 illustrates a parameterized circuit for implementing the engineered likelihood function (ELF). Here $S(x,\theta)=V^\dagger WR(x)W^\dagger V$ implicitly contains θ by virtue of its construction (FIG. 3). The operator $R(x)=\exp(-ix|0\rangle\langle 0|)$. The measurement $\Pi_0$ returns 0 only if the readouts on all of the qubits are 0, and returns 1 in any other cases.

FIG. 8 illustrates a geometric interpretation of θ as an angle parameter between $|0\rangle$ and $|\xi\rangle = V^\dagger W|0\rangle$. The operator $S(x,\theta)$ can then be rewritten as $\exp(-ix|\xi\rangle\langle\xi|)$.

The ELF then takes the form of $$p(d|\theta, \vec{x}) = \frac{1 + (-1)^d \langle 0|Q(\theta; \vec{x})|0\rangle}{2}$$

where $Q(\theta; \vec{x})$ is the circuit in FIG. 2. With the ELF defined, one can use the rest of the Bayesian inference machinery laid out in Ref 7 for estimating the overlap $\langle 0|V^\dagger W|0\rangle$.

Training the Word Embedding

If the vocabulary contains in total N words, two sets of quantum states are defined: $E=\{|v_i\rangle, i\in[N]\}$ and $C=\{|w_i\rangle,$ i∈[N]}. Here the set E represents the embedding which is sought, while the set C is an auxiliary set of states for capturing the "context." One way to parametrize the states in both sets is by the approach described in FIG. 6, where each state $|v_i\rangle = U(f(x, \vec{\eta}_{c,i}), \vec{\eta}_{q,i})|0\rangle$. The same applies to the states in C. The training process is to minimize the error $$\sum_{w,b\in T} |\sigma(\text{Re}\langle v_x|w_y\rangle) - b|$$

where T is the training set and σ is a sigmoid function. After the training, the set E represents the quantum enhanced word embedding while the set C can be discarded. With proper choices of the sigmoid function as well as the setting in FIG. 6, the parameter gradients can be efficiently evaluated across the classical and quantum components.

Testing an Embedding by Analogy

In the classical setting one would typically carry out simple tests such as $\vec{v}_{king} - \vec{v}_{man} + \vec{v}_{woman} \approx \vec{v}_{queen}$ for an analogy "king:man=queen:woman". Quantum mechanically, one would instead transform the problem to one of overlap estimation, since evaluating the 2-norm of the error vector $|\vec{v}_1\rangle = |u_1\rangle + |v_2\rangle - |u_2\rangle$ amounts to $$\||v_1\rangle - |u_1\rangle + |v_2\rangle - |u_2\rangle\|_2^2 = 4 - 2(\langle v_1|u_1\rangle + \langle v_1|u_2\rangle + \langle v_2|u_1\rangle + \langle v_2|u_2\rangle - \langle v_1|v_2\rangle - \langle u_1|u_2\rangle)$$

where each of the overlap term can be estimated with previously described methods.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred to as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2"×2" complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
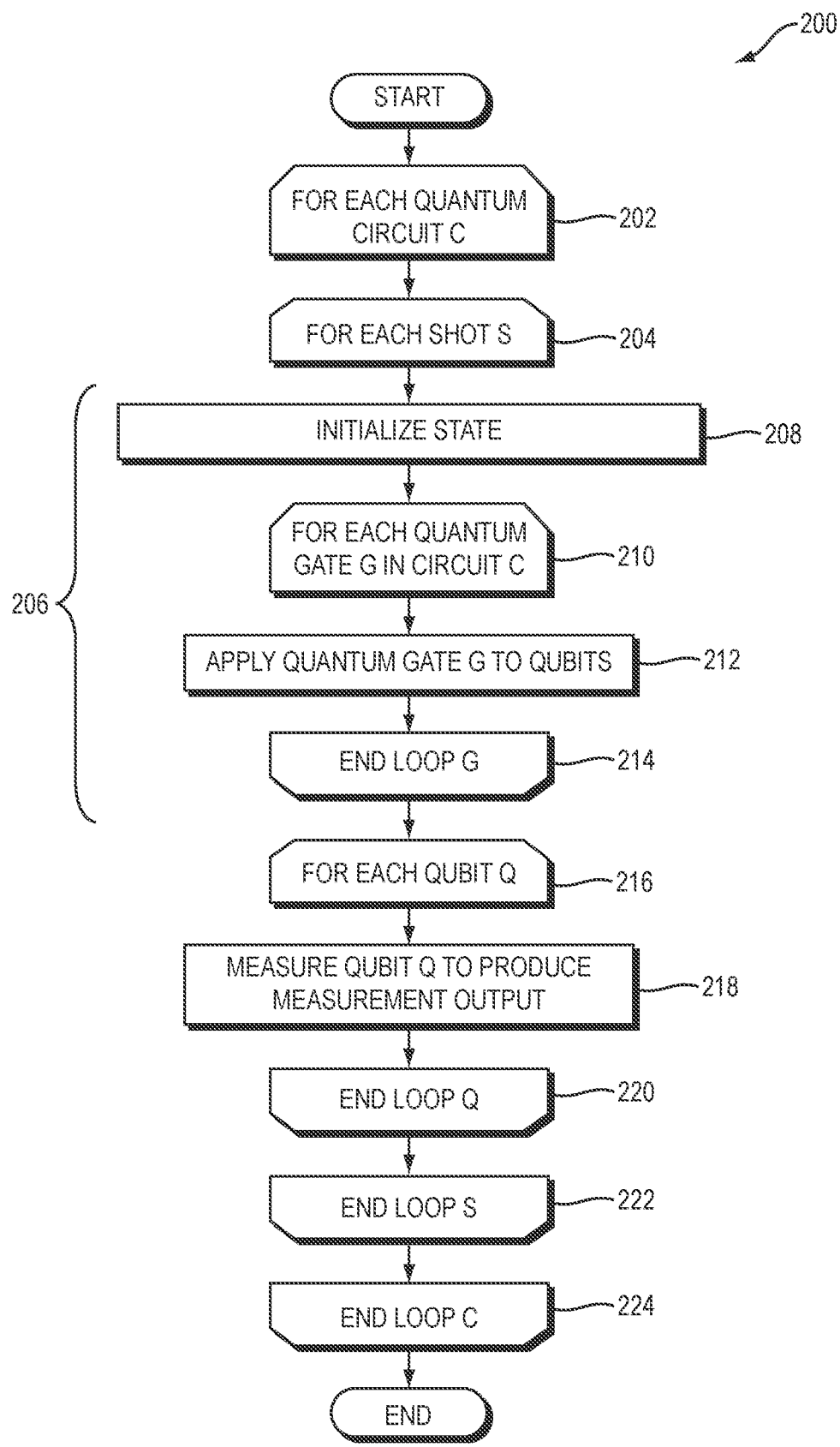
FIG. 2A is a flowchart of a method performed by the quantum computer of FIG. 1 according to one embodiment of the present invention.
Figure 2B:
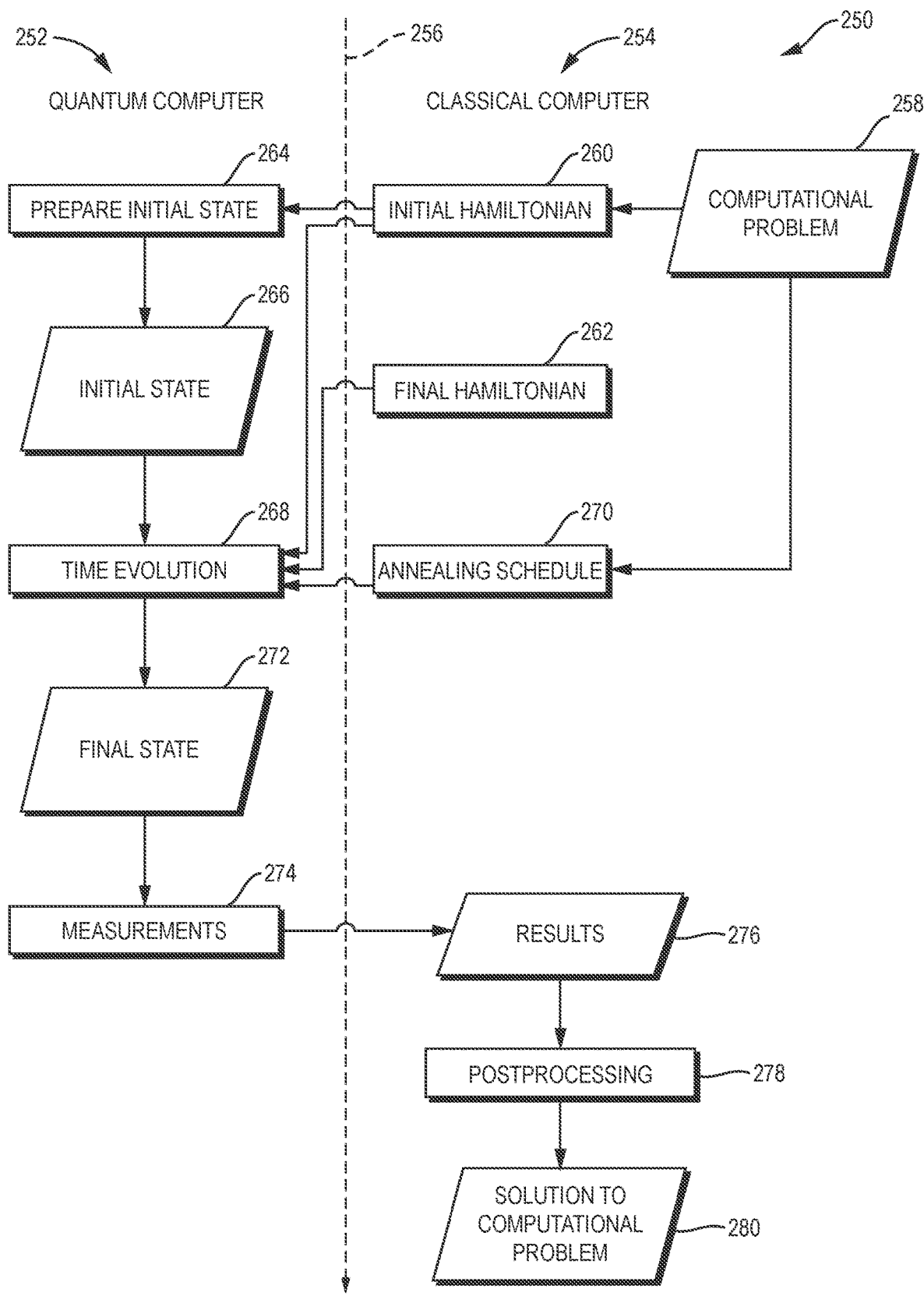
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Figure 1:
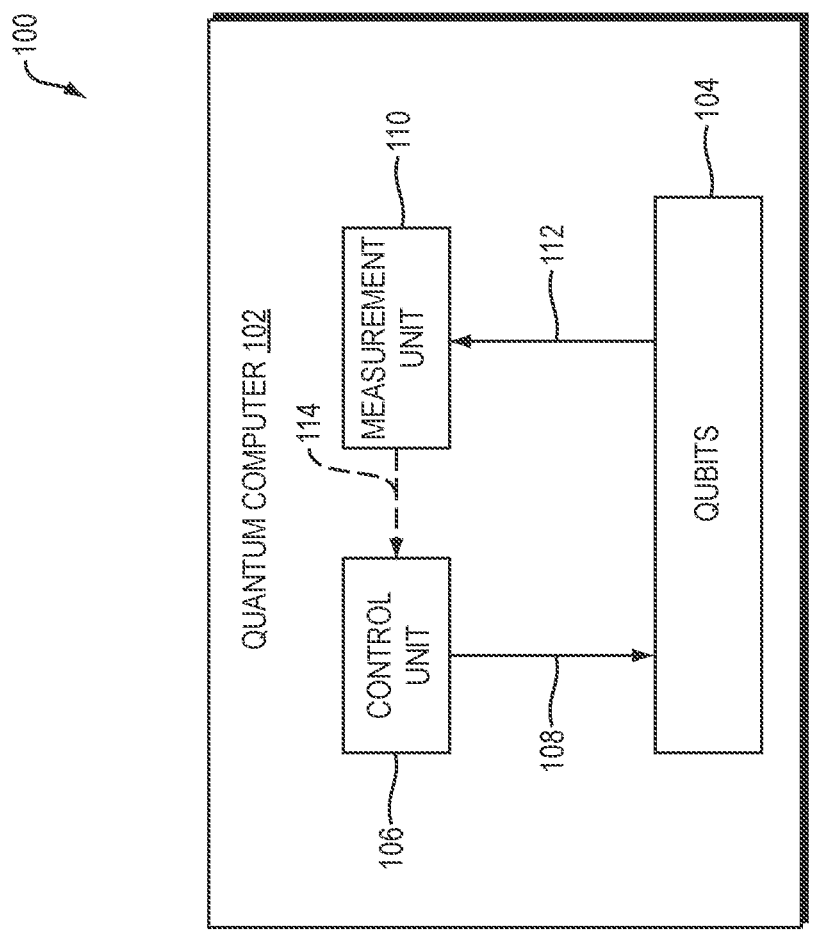
FIG. 1 is a diagram of a quantum computer according to one embodiment of the present invention.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signals 114 from the measurement unit 110 to the control unit 106. Such feedback signals 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Referring to FIG. 3, a diagram is shown of a hybrid quantum-classical computer (HQC) 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

Any reference herein to the state |0⟩ may alternatively refer to the state |1⟩, and vice versa. In other words, any role described herein for the states |0⟩ and |1⟩ may be reversed within embodiments of the present invention. More generally, any computational basis state disclosed herein may be replaced with any suitable reference state within embodiments of the present invention.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention include techniques for generating, on a quantum computer, a plurality of quantum state representations including one quantum state representation for at least one word in a word pair set, and for training a quantum correlation between: (1) words in a word pair X in the pairs of words on the quantum computer using an error function, (2) the numerical value $B_X$ corresponding to the word pair X, and (3) the plurality of quantum state representations. Such functions are inherently rooted in quantum computing technology and cannot be performed mentally or manually, especially when applied to large numbers of word pairs (e.g., N>100,000).

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method, performed on a hybrid quantum-classical computer system, for generating a word embedding, the computer system comprising a classical computer and a quantum computer,
   the classical computer including a processor, a non-transitory computer-readable medium, and computer instructions stored in the non-transitory computer-readable medium;
   the quantum computer including a quantum component, having a plurality of qubits, which accepts a sequence of instructions to evolve a quantum state based on a series of quantum gates;
   wherein the computer instructions, when executed by the processor, perform a method for generating, on the hybrid quantum-classical computer, a word embedding for at least one pair of words;
   wherein the classical computer includes a training set of training samples comprising: (1) a word pair set, the word pair set comprising N pairs of words, wherein N≥1, and (2) for each pair of words P in the word pair set, a numerical value $B_P$ indicating a classical correlation between the words in the pair of words P;
   the method comprising:
   generating, on the quantum computer, a plurality of quantum state representations including one quantum state representation for at least one word in the word pair set; and training a quantum correlation between: (1) words in a word pair X in the pairs of words on the quantum computer using an error function, (2) the numerical value $B_X$ corresponding to the word pair X, and (3) the plurality of quantum state representations, the word embedding including the quantum correlation.

2. The method of claim 1, wherein training the quantum correlation comprises using an engineered likelihood function to train the quantum correlation.

3. The method of claim 2, wherein the engineering likelihood function is implemented as a parameterized quantum circuit.

4. The method of claim 1, wherein training the quantum correlation comprises using Bayesian inference to train the quantum correlation.

5. The method of claim 1, wherein N>100,000.

6. The method of claim 1, wherein the training set comprises a set of triples (x, y, b), and wherein, in each of the triples T: (1) x and y in triple T are two words in a corresponding pair of words in the word set, and (2) b in triple T is a binary value indicating whether the two words in the corresponding pair of words are semantically correlated.

7. The method of claim 1, wherein for each pair of words P in the word pair set, the numerical value $B_P$ comprises a binary value indicating whether the words in the pair of words P are semantically correlated.

8. The method of claim 1, further comprising generating, on the classical computer, the training set using the "skip-gram with negative sampling" method.

9. The method of claim 1, wherein training the quantum correlation comprises training the quantum correlation using quantum amplitude estimation.

10. The method of claim 1, further comprising applying the word embedding in a natural language processing (NLP) application.

11. The method of claim 1, further comprising determining a level of association between each pair of words by a distance metric.

12. The method of claim 11, wherein the distance metric is represented by a function of at least one quantum state.

13. The method of claim 1, wherein the classical correlation comprises a semantic correlation.

14. The method of claim 1, wherein the classical correlation comprises a contextual correlation.

15. The method of claim 1, wherein the training includes evaluating quantum representations of each word pair using a SWAP test.

16. The method of claim 1, wherein the training includes testing the word embedding using overlap estimation.

17. The method of claim 1, wherein the generating comprises generating, on the quantum computer, the plurality of quantum state representations including one quantum state representation for each of the words in the N pairs of words in the word pair set.

18. The method of claim 1, further comprising repeating the training for each word pair in the N pairs of words.

19. The method of claim 18, wherein N>100,000.

20. A hybrid quantum-classical computer system for generating a word embedding, comprising:

a classical computer and a quantum computer;

the classical computer including a processor, a non-transitory computer-readable medium, and computer instructions stored in the non-transitory computer-readable medium;

the quantum computer including a quantum component, having a plurality of qubits, which accepts a sequence of instructions to evolve a quantum state based on a series of quantum gates;

wherein the computer instructions, when executed by the processor, perform a method for generating, on the hybrid quantum-classical computer, a word embedding for at least one pair of words;

wherein the classical computer includes a training set of training samples comprising: (1) a word pair set, the word pair set comprising N pairs of words, wherein N≥1, and (2) for each pair of words P in the word pair set, a numerical value $B_P$ indicating a classical correlation between the words in the pair of words P;

the method comprising:

generating, on the quantum computer, a plurality of quantum state representations including one quantum state representation for at least one word in the word pair set; and training a quantum correlation between: (1) words in a word pair X in the pairs of words on the quantum computer using an error function, (2) the numerical value $B_X$ corresponding to the word pair X, and (3) the plurality of quantum state representations, the word embedding including the quantum correlation.

21. The system of claim 20, wherein training the quantum correlation comprises using an engineered likelihood function to train the quantum correlation.

22. The system of claim 21, wherein the engineering likelihood function is implemented as a parameterized quantum circuit.

23. The system of claim 20, wherein training the quantum correlation comprises using Bayesian inference to train the quantum correlation.

24. The system of claim 20, wherein N>100,000.

25. The system of claim 20, wherein the training set comprises a set of triples (x, y, b), and wherein, in each of the triples T: (1) x and y in triple T are two words in a corresponding pair of words in the word set, and (2) b in triple T is a binary value indicating whether the two words in the corresponding pair of words are semantically correlated.

26. The system of claim 20, wherein for each pair of words P in the word pair set, the numerical value $B_P$ comprises a binary value indicating whether the words in the pair of words P are semantically correlated.

27. The system of claim 20, further comprising generating, on the classical computer, the training set using the "skip-gram with negative sampling" method.

28. The system of claim 20, wherein training the quantum correlation comprises training the quantum correlation using quantum amplitude estimation.

29. The system of claim 20, wherein the method further comprises applying the word embedding in a natural language processing (NLP) application.

30. The system of claim 29, wherein the distance metric is represented by a function of at least one quantum state.

31. The system of claim 20, wherein the method further comprises determining a level of association between each pair of words by a distance metric.

32. The system of claim 20, wherein the classical correlation comprises a semantic correlation.

33. The system of claim 20, wherein the classical correlation comprises a contextual correlation.

34. The system of claim 20, wherein the training includes evaluating quantum representations of each word pair using a SWAP test.

35. The system of claim 20, wherein the training includes testing the word embedding using overlap estimation.

36. The system of claim 20, wherein the generating comprises generating, on the quantum computer, the plurality of quantum state representations including one quantum state representation for each of the words in the N pairs of words in the word pair set.

37. The system of claim 36, wherein N>100,000.

38. The system of claim 20, further comprising repeating the training for each word pair in the N pairs of words.

* * * * *